United States Patent
Ibryam

(10) Patent No.: US 11,586,460 B2
(45) Date of Patent: Feb. 21, 2023

(54) SIDECAR-BASED INTEGRATION CAPABILITIES FOR CONTAINERIZED APPLICATIONS

(71) Applicant: Red Hat, Inc., Raleigh, NC (US)

(72) Inventor: Bilgin Ismet Ibryam, London (GB)

(73) Assignee: Red Hat, Inc., Raleigh, NC (US)

( * ) Notice: Subject to any disclaimer, the term of this patent is extended or adjusted under 35 U.S.C. 154(b) by 203 days.

(21) Appl. No.: 16/942,334

(22) Filed: Jul. 29, 2020

(65) Prior Publication Data

US 2022/0035646 A1 Feb. 3, 2022

(51) Int. Cl.
G06F 15/16 (2006.01)
G06F 9/455 (2018.01)
H04L 67/02 (2022.01)
G06F 9/445 (2018.01)

(52) U.S. Cl.
CPC ...... *G06F 9/45558* (2013.01); *G06F 9/44505* (2013.01); *H04L 67/02* (2013.01); *G06F 2009/4557* (2013.01); *G06F 2009/45562* (2013.01)

(58) Field of Classification Search
CPC ............. G06F 9/45558; G06F 9/44505; G06F 2009/45562; G06F 2009/4557; H04L 67/02; H04L 51/10
See application file for complete search history.

(56) References Cited

U.S. PATENT DOCUMENTS

| | | | |
|---|---|---|---|
| 2019/0155633 A1* | 5/2019 | Faulhaber, Jr. | G06N 5/04 |
| 2019/0273746 A1 | 9/2019 | Coffing | |
| 2019/0294779 A1 | 9/2019 | Suneja et al. | |
| 2019/0347121 A1* | 11/2019 | Luo | G06F 9/542 |
| 2020/0104226 A1 | 4/2020 | Yang et al. | |
| 2020/0133789 A1* | 4/2020 | Natanzon | G06F 16/128 |
| 2021/0294632 A1* | 9/2021 | Kondo | G06F 9/4856 |
| 2021/0321012 A1* | 10/2021 | Sasaki | G06F 9/45558 |

FOREIGN PATENT DOCUMENTS

CN 105981333 2/2019

OTHER PUBLICATIONS

Announcing Distributed Application Runtime (Dapr), an open source project to make it easier for every developer to build microservice applications; (https://cloudblogs.microsoft.com/opensource); Oct. 16, 2019; retrieved Apr. 6, 2020; pp. 1-7.
How Microsoft's Dapr Simplifies Developing and Deploying Microservices by Janakiram MSV; Feb. 12, 2020; pp. 1-13.
Sidecar pattern; https://doc.microsoft.com/en-us/azure/architecture/patterns/sidecare; Jun. 23, 2017; retrieved Apr. 6, 2020; pp. 1-5.

* cited by examiner

*Primary Examiner* — John B Walsh
(74) *Attorney, Agent, or Firm* — K&L Gates LLP

(57) ABSTRACT

Methods and systems for improved integration functions for applications are provided. In one embodiment, a method is provided that includes receiving a request to execute an application. The request may specify a primary container image for the application and a secondary container image for an integration function used by the application. A primary container may be created for execution of the primary container image and a secondary container image may be created for execution of the secondary container image. The primary and secondary containers may be executed to implement the application.

20 Claims, 6 Drawing Sheets

SIDECAR-BASED INTEGRATION CAPABILITIES FOR CONTAINERIZED APPLICATIONS

BACKGROUND

Software applications may be configured to execute within containers, which may virtualize one or more computing resources (e.g., processors and/or memory) for use in executing the software applications. In particular, software applications may be executed within containers within shared computing environments, such as cloud computing environments, where multiple software applications are configured to share the computing resources of one or more computing devices.

SUMMARY

The present disclosure presents new and innovative systems and methods for providing integration capabilities to software applications. In a first aspect, a method is provided that includes receiving a request to execute an application. The request may specify (i) a primary container image including primary operations of the application and (ii) a secondary container image including an integration function necessary for proper execution of the primary operations. The method may also include creating a primary container for execution of the primary container image and creating a secondary container for execution of the secondary container image, where the secondary container is a sidecar container of the primary container image. The primary container and the secondary container may both be executed to implement the application.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1:
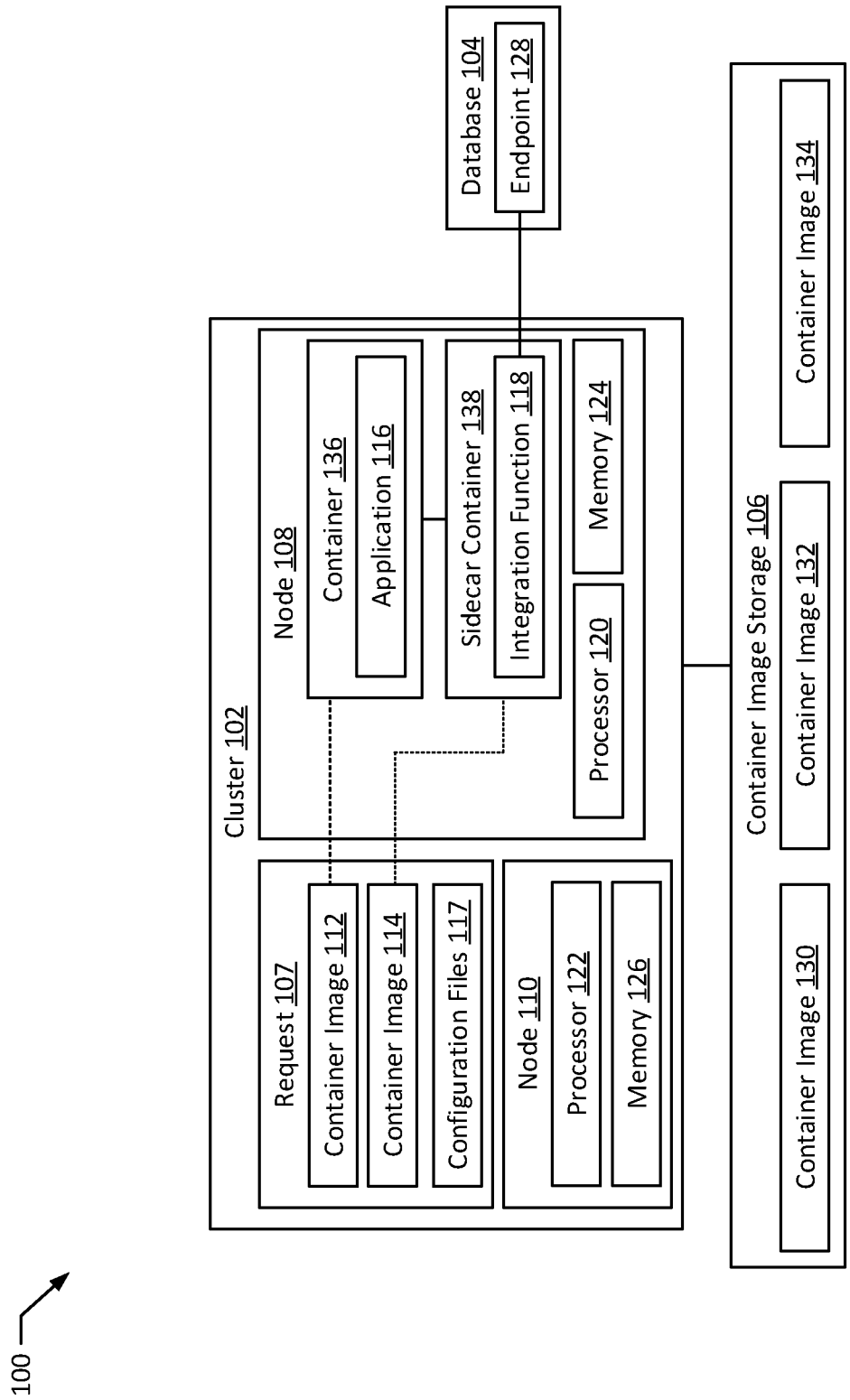
FIG. 1 illustrates a system for initializing and executing applications within containers according to an exemplary embodiment of the present disclosure.

Software applications may rely on external functionality to provide one or more services or features used during execution of the application. For example, software applications may rely on one or more integration functions. Integration functions may provide functionality to connect the software applications to existing computing environments. Specifically, the integration functions may implement one or more enterprise integration patterns that are necessary for the software applications to integrate with other computing devices and/or computing systems. For example, the enterprise integration patterns may include messaging systems, messaging channels, shared database patterns, file transfer patterns, messaging construction systems, message routing rules, message transformation patterns, messaging endpoint construction and implementation, system management patterns, and the like. As a specific example, an integration function may provide communication functionality for generating, routing, and receiving requests to and from other applications and/or other computing devices within the computing environment. As another example, an integration function may provide storage capabilities to ensure compatibility with existing storage systems, security of communications with existing storage systems, and/or accuracy of data provided to or received from existing storage systems. Enterprise integration patterns are described in greater detail in Gregor Hohpe & Bobby Woole, Enterprise Integration Patterns: Designing, Building, and Deploying Messaging Solutions (1st Ed. 2004), which is hereby incorporated by reference.

Typically, software applications incorporate integration functions as libraries. For example, a developer creating a software application may add a function call to an external library that includes one or more functions that implement the integration functions. As a specific example, the external library may be provided by an integration platform or enterprise service bus, such as the Red Hat® Fuse integration platform and/or the Apache® Camel integration platform. In such instances, when the application is compiled or built for execution, the application is combined and deployed with the external libraries. For example, in a shared computing environment, code implementing the operational logic of the application may be compiled or otherwise combined with code from the external library implementing the integration function into a package or other executable format for execution within a container or other virtualized environment of the shared computing environment.

Building and deploying applications in this manner allows for integration functions to be incorporated into applications without requiring developers to create or manually add the code to the application perform the integration functions. However, deploying the operational logic of the application in combination with code for integration functions can increase maintenance frequency and complexity for the application after it is deployed. For example, because code for the integration function is included within the package once deployed, the package may need to be rebuilt any time an integration function used by the application is updated. In practice, applications may use multiple integration functions (e.g., five or more integration functions, 10 or more integration functions). Accordingly, integration functions and, by extension, application packages may need to be regularly updated, recompiled, and redeployed. Furthermore, implementing integration functions in this way requires each application package to execute its own copy of the integration function. Where multiple applications use the same integration function, such implementations can result in wasted computing resources, as integration functions are executed duplicatively. Additionally, where the integration functions provide networking or other communication features, duplicative implementation of the same or similar integration functions may result in added network complexity, as additional network endpoints may be added for each implementation of the integration functions.

Accordingly, there exists a need to implement integration functions such that the integration functions can be updated without requiring recompilation and redeployment of application packages. Additionally, the integration functions may be preferably implemented such that multiple applications can use the same implementation of an integration function. One solution to this problem is to execute applications and corresponding integration functions within separate containers of a shared computing environment. For example, an application may execute in a primary container (e.g., an application image instantiated into a primary container) of a computing environment (e.g., a node within the computing environment). The application, or a request to execute the application, may specify one or more integration functions that are utilized by the application when executed. For example, the integration functions may be identified as particular container images implementing the integration functions. When the primary container executing the application is instantiated, the corresponding integration functions may also be instantiated into separate containers. The containers implementing the integration functions may be instantiated as sidecar containers of the primary container. As the application executes, the application may communicate with the integration functions using messaging calls and, in response, the integration functions may execute within the sidecar containers to implement the necessary features. Furthermore, in certain instances, multiple applications executing in different primary containers may communicate with the same sidecar container implementing a particular integration function utilized by the multiple applications.

FIG. 1 illustrates a system 100 for initializing and executing applications within containers according to an exemplary embodiment of the present disclosure. The system 100 includes a cluster 102, a database 104, and a container image storage 106. The cluster 102 may at least partially implement a shared computing environment, such as a cloud computing environment. For example, the cluster 102 may include one or more nodes 108, 110 representing physical or virtual computing devices that may be used to implement or execute applications. In particular, the nodes 108, 110 may include processors 120, 122 and/or memories 124, 126, which may be physical or virtual, available to implement or execute applications. For example, the cluster 102 and/or the node 108 may execute applications using a containerization platform, such as Kubernetes and/or Red Hat® OpenShift®.

The cluster 102 may be configured to receive requests 107 to execute particular applications. For example, the request 107 may specify one or more container images 112, 114 and may include one or more configuration files 117. As a specific example, the request 107 may identify a container image 112 that implements an application 116 that is to be executed by the cluster 102. For example, the container image 112 may include an executable package which, when executed within a node 108, 110 of the cluster 102, implements the application 116. The request 107 may also identify a container image 114 that implements one or more integration functions 118 used by the application 116. As discussed above, the integration functions may implement one or more enterprise integration patterns that are necessary to ensure the proper operation of the application 116 and/or the proper integration of the application 116 with existing computing platforms (e.g., computing networks, computing devices, storage platforms, communication platforms, and the like). For example, the integration functions 118 may implement one or more messaging systems, messaging channels, shared database patterns, file transfer patterns, messaging construction systems, message routing rules, message transformation patterns, messaging endpoint construction and implementation, system management patterns, and the like.

In one specific example, the application 116 may be configured to retrieve data stored within the database 104, analyze the retrieved data, and store new data entries within the database 104 based on the analyzed data. In such instances, the integration function 118 may be configured to retrieve data, remove duplicates from the retrieved data, store the new data entries, and/or to ensure that the new data entries have not been previously stored within the database 104.

The container images 112, 114 may be included within the request 107. Additionally or alternatively, the container images 112, 114 may be retrieved from the container image storage 106. For example, the container image storage 106 may be a database or other storage system configured to store multiple container images 130, 132, 134 for execution within the cluster 102. The container images 130, 132, 134 may include container images storing different applications, different integration functions, different versions of particular applications, different versions of particular integration functions, different configurations of particular applications, different configurations of particular integration functions, and the like. Accordingly, in certain instances, the request 107 may include an identifier of the container images 112, 114 implementing the application 116 and the integration function 118. Upon receiving the request 107, the cluster 102 and/or the nodes 108, 110 may retrieve the container images 112, 114 for execution.

In certain instances, rather than receiving a container image 112 for the application 116, the request 107 may contain or identify application code (e.g., Java® application code and the like) that is to be compiled to form the container image 112. In such instances, the cluster 102 and/or the node 108, 110 may compile the application code to form the container image 112 and may then load the container image 112 into a container 136 and/or store the container image 112 in the container image storage 106.

After receiving the request 107 and the container images 112, 114, the cluster 102 may assign container images 112, 114 to a node 108 for execution. In particular, a container 136 may be created within the node 108 based on the container image 112. Additionally, a sidecar container 138 may be created based on the container image 114. For example, the sidecar container 138 may be a container within the container environment that is subordinate to and runs alongside the container image 114. The node 108 may then execute the containers 136, 138 to implement the application 116 and the integration function 118. While executing, the application 116 and the integration function 118 may communicate via the containers 136, 138 using a communication protocol, such as hypertext transfer protocol (HTTP) calls or packets. This may differ from the above-discussed library-based implementation of integration functions. For example, in library-based implementations, rather than using communication protocols to invoke integration functions, applications may rely on function calls within the same container.

One or both of the application 116 and the integration function 118 may be configurable based on configuration parameters specified within the configuration files 117. For example, the application 116 may be configured to use additional or alternative integration functions other than the integration function 118. Additionally or alternatively, the application 116 may be configurable to perform one or more different tasks. Continuing the previous example, the application 116 may be configured to receive and analyze different types of data stored within the database 104. Additionally or alternatively, the application 116 and the integration function 118 may be configured to use different networking, communication, encryption, storage, or other protocols. For example, the integration function 118 may be configurable to communicate with secured databases and/or unsecured databases. Additionally or alternatively, the integration function 118 may be configurable to optionally perform deduplication of data received from and/or stored within the database 104. The configuration files 117 may be prepared to specify one or more of the configurable parameters for the application 116 and/or the integration function 118. In such instances, after receiving the container images 112, 114 from the request 107 and/or the container image storage 106, the cluster 102 may configure the container images 112, 114 according to one or more configuration parameters specified within the configuration files (e.g., at runtime when the container images begin executing). In certain instances, the request 107 may include separate configuration files 117 for the application 116 and any integration functions 118 used by the application 116. In additional or alternative instances, the request 107 may include more than one configuration file 117 for the application 116 and/or more than one configuration file 117 for an integration function 118.

One or more of the cluster 102, the nodes 108, 110, the database 104, and the container image storage 106 may be implemented by a computer system. For example, the processors 120, 122 and the memories 124, 126 may be configured to implement one or more operational features of the nodes 108, 110. As a specific example, the memories 124, 126 may store instructions which, when executed by the processors 120, 122, may cause the processors 120, 122 to implement at least one operational feature of the nodes 108, 110. Further, although not depicted, the cluster 102, the database 104, and the container image storage 106 may similarly include processors and/or memories configured to implement at least one operational feature of the cluster 102, the database 104, and/or the container image storage 106. In one such instance, the cluster 102 may be implemented at least in part as an orchestrator executing on a computing device, such as one of the nodes 108, 110 within the cluster 102.

The cluster 102, the nodes 108, 110, the database 104, and the container image storage 106 may be configured to communicate using a network. For example, the cluster 102, the nodes 108, 110, the database 104, and the container image storage 106 may communicate with the network using one or more wired network interfaces (e.g., Ethernet interfaces) and/or wireless network interfaces (e.g., Wi-Fi®, Bluetooth®, and/or cellular data interfaces). In certain instances, the network may be implemented as a local network (e.g., a local area network), a virtual private network, and/or a global network (e.g., the Internet).

Figure 2:
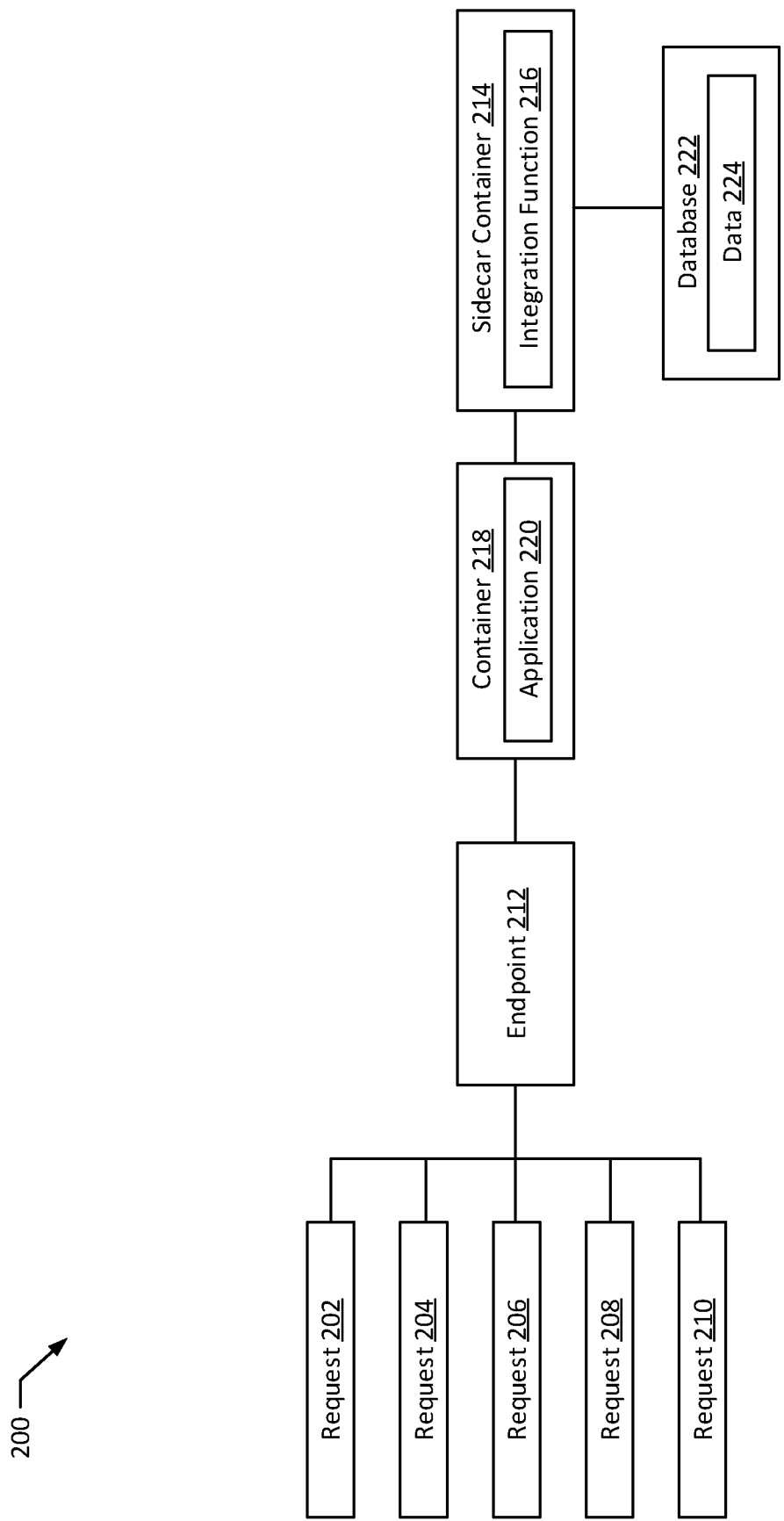
FIG. 2 illustrates an implementation of an idempotency integration function using a sidecar container according to an exemplary embodiment of the present disclosure.

FIG. 2 illustrates an implementation 200 of an idempotency integration function 216 using a sidecar container 214 according to an exemplary embodiment of the present disclosure. The integration function 216 is configured to provide idempotency services for data storage. In particular, the implementation 200 includes a container 218 implementing an application 220 and a sidecar container 214 implementing the integration function 216. The container 218 is communicatively coupled to the sidecar container 214, and the sidecar container 214 is communicatively coupled to a database 222 storing data 224.

The application 220 may be configured to store new data entries within the database 222. In particular, the container 218 is communicatively coupled to an endpoint 212, which may represent a network endpoint on a local network (e.g., a network within a cluster 102 and/or a network within a node 108, 110). Via the endpoint 212, the application 220 may receive one or more requests 202, 204, 206, 208, 210 to store new data within the database 222. The requests 202, 204, 206, 208, 210 may include, reference, or otherwise specify data to be stored within the database 222. The application 220 may be configured to create a new data entry for storage within the database 222. In certain instances, in addition to generating and storing data entries, the application 220 may perform additional actions (e.g., generating a summary email, updating a log file, notifying one or more users).

To store new data entries within the database 222, the application 220 may be configured to communicate with the database 222 via the integration function. In particular, before storing a new data entry, it may be necessary to perform an idempotency check to ensure that storing the new data entry within the database will not affect previously-stored data 224 within the database 222. For example, the database 222 may be checked to ensure that a data entry corresponding to the new data entry has not been previously stored within the database 222. Idempotency checks such as these may make sure that data entries added to the database do not inadvertently overwrite existing data entries and that the new data entries do not duplicate data entries unnecessarily, which could adversely impact future analyses by disproportionately including copies of particular data entries. In particular, one or more data fields (e.g., order ID, data entry index, employee ID) within the data 224 may be checked to determine whether an existing data entry with identical data field(s) has not been previously stored within the database 222. In certain instances, the idempotency check may be performed to ensure that there are no identical data entries stored within the database 222 (e.g., data entries with completely identical data fields). In additional or alternative instances, the idempotency check may be performed on a subset of the data fields. In such instances, the subset of the data fields may be specified by a user (e.g., within a configuration file 117 and/or within a request transmitted by the application 220 to the integration function 216.

To invoke the integration function 216, the application 220 may communicate with the integration function 216 using one or more HTTP messages. For example, the application 220 may transmit an HTTP message to the sidecar container 214 that includes the data entry to be stored within the database 222. In certain instances, the HTTP message may include additional configuration details for the idempotency check (e.g., data fields for analysis by the integration function 216). After performing the idempotency check and/or storing the new data entry, the integration function 216 may transmit an HTTP message to the application 220 indicating the results of the idempotency check and/or the storage operation. For example, if the integration function 216 determines that no corresponding data entries were previously stored within the database 222, the integration function 216 may proceed with storing the new data entry within the database 222. After storing the new data entry, the integration function 216 may transmit an HTTP message to the application 220 indicating that the storage operation was successful. For example, the HTTP message may include a storage index or other identifier of the new data entry within the database 222. As another example, if the integration function 216 determines that a corresponding data entry was previously stored within the database 222, the integration function 216 may transmit an HTTP message to the application 220 indicating that the idempotency check was not successful. For example, the HTTP message may include a storage index or other identifier of the corresponding or conflicting data entry within the database 222.

Figure 3:
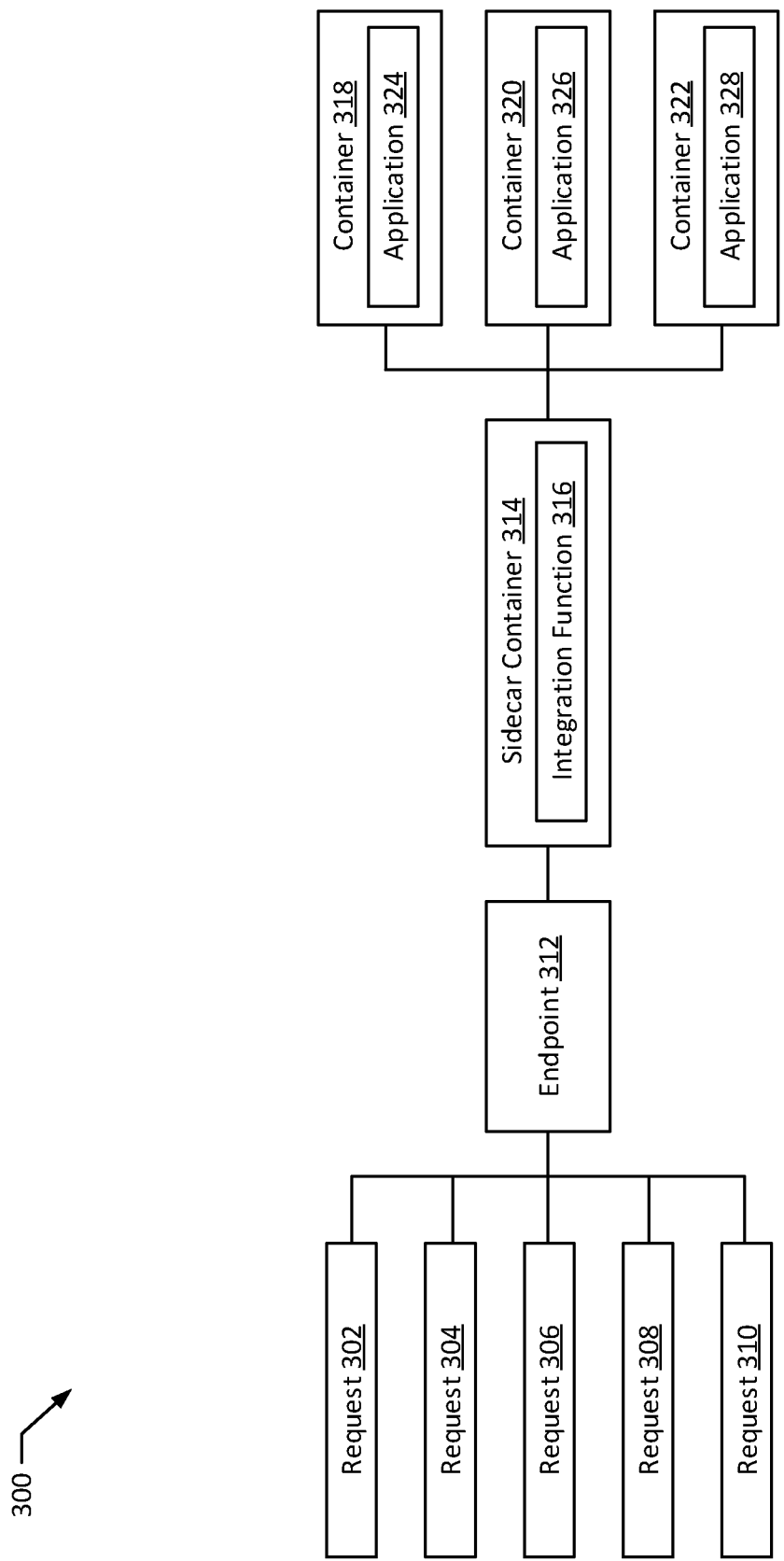
FIG. 3 illustrates an implementation of a request routing integration function for multiple applications using a sidecar container according to an exemplary embodiment of the present disclosure.

FIG. 3 illustrates an implementation 300 of a request routing integration function 316 for multiple applications using a sidecar container 314 according to an exemplary embodiment of the present disclosure. The integration function 316 is configured to route requests 302, 304, 306, 308, 310 to multiple applications 324, 326, 328. In particular, the implementation 300 includes a sidecar container 314 implementing the integration function 316 and containers 318, 320, 322 implementing applications 324, 326, 328. The sidecar container 314 is communicatively coupled to the containers 318, 320, 322 and to an endpoint 312.

Similar to the endpoint 212, the endpoint 312 may receive requests 302, 304, 306, 308, 310 via a network (e.g., a local or global network). The requests 302, 304, 306, 308, 310 may be received to initiate execution of the applications 324, 326, 328. In particular, each request 302, 304, 306, 308, 310 may be transmitted to initiate execution of one of the applications 324, 326, 328. In certain instances, the requests 302, 304, 306, 308, 310 may specify the corresponding application 324, 326, 328. For example, the application 324, 326, 328 for execution may be specified within the contents of the requests 302, 304, 306, 308, 310. For instance, the application 324, 326, 328 may be identified by an application name, an application identifier (e.g., an alphanumeric identifier), an IP address, a network address, and the like. The requests 302, 304, 306, 308, 310 may contain data used in executing the applications 324, 326, 328. For example, request 302, 304, 306, 308, 310 to execute an application 324, 326, 328 for data storage may include data to be stored by the application 324, 326, 328. As another example, a request 302, 304, 306, 308, 310 to execute an application 324, 326, 328 to generate and send an email may include content or other data for the body and subject of the email and an email address to which the email is to be sent. As a further example, a request 302, 304, 306, 308, 310 to execute an application 324, 326, 328 to update a log file may include an identifier of the log file and one or more contents to be added to the log file.

Upon receiving a request 302, 304, 306, 308, 310 at the endpoint 312, the integration function 316 may identify a corresponding application 324, 326, 328. For example, the integration function 316 may determine whether the request 302, 304, 306, 308, 310 includes an identifier of the application 324, 326, 328 for execution (e.g., an alphanumeric identifier, application name, IP address, network address). If so, the integration function 316 may identify the corresponding application 324, 326, 328 and route the request 302, 304, 306, 308, 310 to the corresponding application 324, 326, 328 (e.g., within one or more HTTP packets). In other instances, the request 302, 304, 306, 308, 310 may not include an application identifier. In such instances, the integration function 316 may instead analyze the contents of the request 302, 304, 306, 308, 310. For example, the integration function 316 may determine a type of contents within the request 302, 304, 306, 308, 310 and may identify the corresponding application 324, 326, 328 based on the contents. In one specific example, the request 304 may include an email address, and the integration function 316 may identify a corresponding application 326 configured to generate and send an email.

The integration function 316 may repeat this process for a plurality of incoming requests 302, 304, 306, 308, 310 to route each request 302, 304, 306, 308, 310 to a corresponding application 324, 326, 328. By implementing the request networking functionality as a single integration function 316 executing within a sidecar container 314 of the containers 318, 320, 322 implementing the applications 324, 326, 328, the implementation 300 may reduce the network complexity within a cloud computing environment, because a single endpoint 312 can be used to receive requests for multiple applications 324, 326, 328. Furthermore, allowing multiple applications 324, 326, 328 to receive requests via a single integration function 316, the implementation 300 may reduce the overall computing resources necessary to implement request networking for the applications 324, 326, 328. In particular, implementing request networking within each of the applications 324, 326, 328 may require additional computing resources, in particular storage and memory resources, even when request networking services are not being used. By contrast, the computing resources allocated to the sidecar container 314 to implement the integration function 316 may be utilized to more efficiently receive requests for multiple applications 324, 326, 328. In this way, the implementation 300 allowing a single integration function to service multiple applications 324, 326, 328 may improve the overall functionality of the cloud computing environment.

It should be understood that the integration function 316 may be combined with other integration functions used by applications. For example, the application 220 may be configured to receive requests 202, 204, 206, 208, 210 at the endpoint 212 using an integration function similar to the integration function 316. In such implementations, the container 218 implementing application 220 may have multiple sidecar containers 214 implementing the integration function 216 and the integration function configured to receive requests at the endpoint 212.

If should be further understood that the implementations discussed above, including the implementations 200, 300 are merely exemplary. Additional or alternative implementations, including additional types of integration functions, may be implemented using similar or identical architecture to that discussed above. All such alternative implementations are hereby considered within the scope of the present disclosure.

Figure 4:
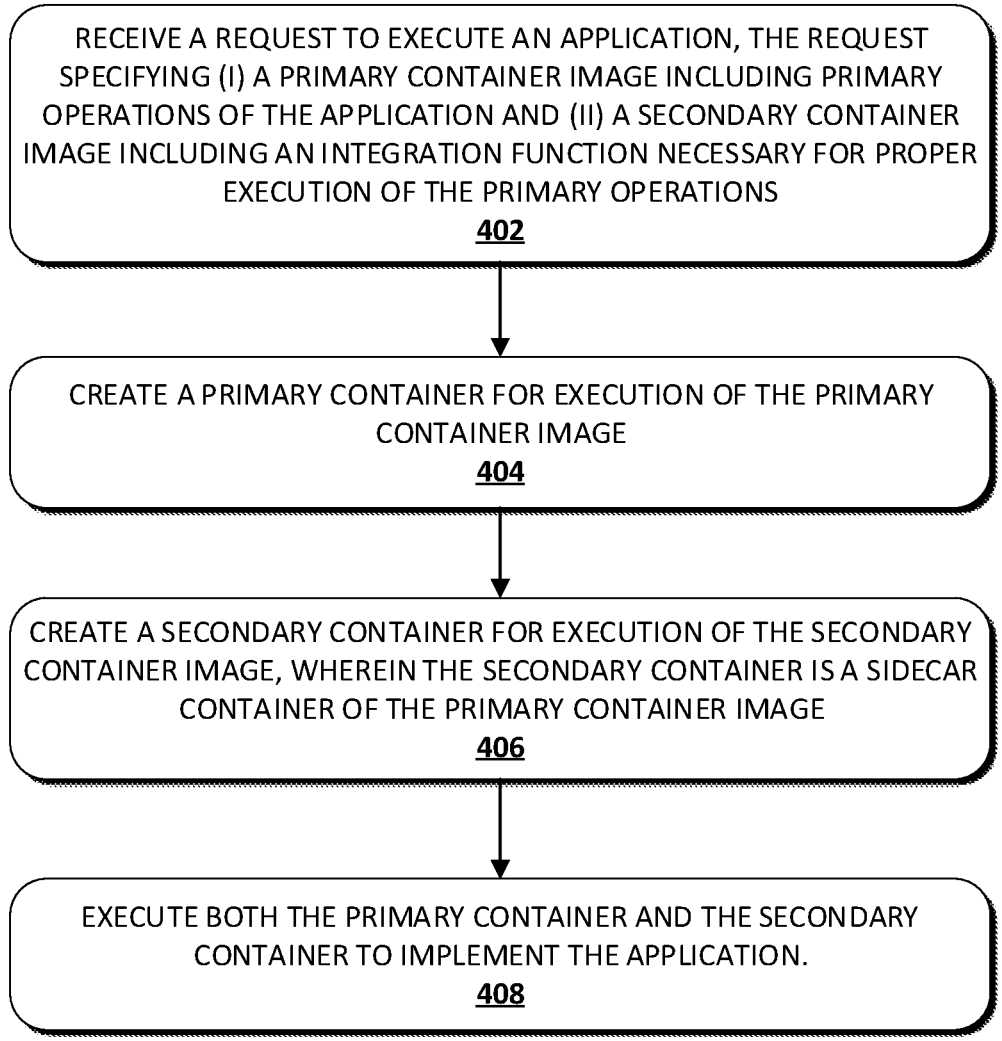
FIG. 4 illustrates a method for initializing and executing an application that utilizes integration functions according to an exemplary embodiment of the present disclosure.

FIG. 4 illustrates a method 400 for initializing and executing an application that utilizes integration functions according to an exemplary embodiment of the present disclosure. The method 400 may be implemented on a computer system, such as the system 100. For example, the method 400 may be implemented at least in part by the cluster 102. The method 400 may also be implemented by a set of instructions stored on a computer readable medium that, when executed by a processor, cause the computer system to perform the method 400. For example, all or part of the method 400 may be implemented by the processors 120, 122 and the memory 124, 126. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving a request to execute an application (block 402). For example, the cluster 102 may receive a request 107 to execute an application 116. The request 107 may specify a primary container image 112 that includes primary operations of the application 116 and a secondary container image 114 that includes an integration function 118. The integration function 118 may be necessary to properly execute the primary operations of the application 116. For example, the integration function 118 may implement one or more enterprise integration patterns necessary to integrate with other applications, computing devices, networks, and the like. As a specific example, the integration function 118 may provide networking services, such as receiving requests at a network endpoint, as discussed in connection with the implementation 300. As another specific example, the integration function 118 may provide data storage services, such as idempotency services for data stored in a database and/or deduplication services for data retrieved from a database, similar to those discussed above in connection with the implementation 200. Further implementations may include integrations that perform other types of services, such as implementing particular messaging protocol patterns. However, the services provided by the integration function may typically be necessary to ensure proper execution of the application identified in the request. For example, where the application is executed to receive, manipulate, and store data, the integration function may provide necessary services such as communicating with the database to store the data and providing idempotency services. In certain implementations, it should also be understood that the request 107 may specify more than one secondary container image 114 executing more than one integration function 118.

A primary container may be created for execution of the primary container image 112 (block 404). For example, the cluster 102 may create a primary container 136 to execute the application 116. The primary container 136 may be created in one of the nodes 108, 110 within the cluster 102. For example, a node 108, 110 may be identified with sufficient computing resources to fulfill the request (e.g., to implement the application 116 and any integration functions 118 identified in the request 107). The container 136 may be created according to a container platform implemented by the cluster 102, such as an OpenShift® container and/or a Kubernetes® container. Once created, all or part of the computing resources of the node 108 (e.g., the processor 120, the memory 124) may be allocated at least temporarily to implementing the container 136. When creating the primary container 136, the node 108 may receive the primary container image 112. For example, in certain instances, the primary container image 112 may be included within the request 107. In additional or alternative implementations, the request 107 may include an identifier of the primary container image 112, and the node 108 may retrieve the primary container image 112 from a container image storage 106 communicatively coupled to the cluster 102. The primary container image 112 may then be loaded into the container for execution by the node 108.

A secondary container may be created for execution of the secondary container image (block 406). For example, the cluster 102 may create a secondary container for execution of the secondary container image 114. In particular, the cluster 102 may implement the secondary container as a sidecar container 138 of the primary container 136 within the node 108. Similar to the primary container 136, all of part of the computing resources for the node 108 may be allocated to implementing the sidecar container 138. Furthermore, the secondary container image 114 may be received by the node 108 (e.g., via the request 107 and/or the container image storage 106) and loaded into the sidecar container 138 for execution. In certain instances, the integration function 118 may already be implemented within the cluster 102. For example, in certain instances, the node 108 may already be implementing a sidecar container 138 executing the integration function 118. In such instances, rather than creating a new secondary container, the node 108 may associate the primary container 136 and/or the application 116 with the preexisting sidecar container to utilize the integration function 118.

The primary container and the secondary container may be executed to implement the application (block 408). For example, the cluster 102 and/or the node 108 may execute the primary container 136 and the sidecar container 138 to implement the application 116. In particular, the containers 136, 138 may be executed to perform the operations specified by the primary container image 112 and the secondary container image 114. When executing, the computing resources (e.g., portions of the processor 120 and memory 124) allocated to execution of the containers 136, 138 may vary over time. For example, the application 116 may be configured to analyze data and to store a record of the analysis in a database 104. In such instances, when a request is received with new data for analysis, additional computing resources may be allocated to the container 136 by the node 108 to facilitate faster analysis of the received data. Once analysis is complete, the application 116 may request that the integration function 118 store a record of the analysis. At that time, additional computing resources may be allocated to the sidecar container 138 for use by the integration function 118 when communicating with the database 104 and store a data record within the database 104. Dynamic allocation of computing resources between the containers 136, 138 and, by extension, the application 116 and the integration function 118, may reduce the overall computing resources necessary to implement the application 116 and the integration function 118, improving the efficiency of the cloud computing environment and allowing for faster execution of applications and/or execution of additional applications.

When executing, the application 116 and the integration function 118 may communicate with one another. For example, the application 116 may transmit a request to the integration function 118 that contains a data record for storage within the database 104. In another example, the application 116 may receive a communication from the integration function 118 confirming that the data record was successfully stored, or indicating that the data record could not be successfully stored. In other implementations, the application 116 may receive a request from an integration function, such as an integration function 316 configured to receive and route requests at a network endpoint. These communications may occur via a standardized communication protocol, such as via HTTP packets. For example, each of the containers 136, 138 may include an HTTP client configured to transmit HTTP packets to other containers (e.g., other containers containing other applications and/or containing integration functions) and a web server configured to receive HTTP packets from other containers (e.g., other containers containing other applications and/or containing integration functions). Communications in this manner may replace techniques typically used to interact with preexisting libraries that implement integration functions. For example, rather than making a function call to a library of integration functions, the application 116 may include transmitting an HTTP request to a sidecar container implementing the integration function. As another example, rather than returning a value or updating a stored value to indicate the result of an integration function's execution, the integration function may include transmitting an HTTP packet to a primary container 136 indicating the result of the integration function's execution.

In this way, the method 400 may enable the use of sidecar containers to implement integration functions to service applications executing in different containers. Implementing integration functions in this way improves the flexibility of how the integration functions are used, updated, and deployed. In particular, implementing the integration functions within sidecar containers may reduce the size and complexity of primary container images for applications, as the primary container images are not required to include executable code for the operations of the integration function. Instead, applications can be configured to make messaging calls to a corresponding sidecar container. Additionally, implementing integration functions within sidecar containers may allow for an individual integration function executing within a particular sidecar container to provide enterprise integration services to multiple applications within a cloud computing environment. This may reduce overall computing resource utilization by allowing multiple applications to share the computing resources used to implement the sidecar container and the integration function.

Figure 5:
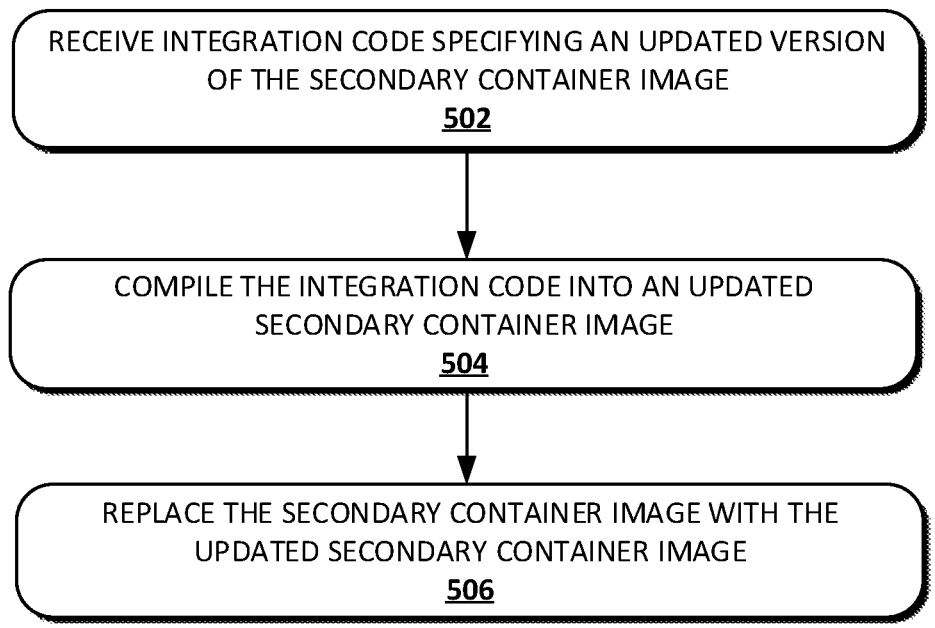
FIG. 5 illustrates a method for updating integration functions according to an exemplary embodiment of the present disclosure.

FIG. 5 illustrates a method 500 for updating integration functions according to an exemplary embodiment of the present disclosure. The method 500 may be implemented on a computer system, such as the system 100. For example, the method 500 may be implemented at least in part by the cluster 102. The method 500 may also be implemented by a set of instructions stored on a computer readable medium that, when executed by a processor, cause the computer system to perform the method 500. For example, all or part of the method 500 may be implemented by the processors 120, 122 and the memory 124, 126. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional. As another example, the method 500 may be implemented at least partially in combination with the method 400. For instance, the method 500 may be performed after the method 400 to update the integration function within the secondary container.

The method 500 may begin with receiving integration code that specifies an updated version of a secondary container image (block 502). For example, the cluster 102 and/or the node 108 may receive integration code that specifies an updated version of the secondary container image 114. As a specific example, the integration code may include an updated version of the integration function 118. For example, the integration code may be prepared to add or update one or more features to the integration function 118. As a specific example, where the integration function 118 is performed to provide idempotency services when storing data in a database, the updated version of the integration function 118 may improve compatibility with one or more types of databases, or may patch security vulnerabilities with the integration function 118 when accessing databases. In certain instances, the integration code may be received in a request, such as a request to update the secondary container image 114 containing the integration function 118.

The integration code may be compiled into an updated secondary container image (block 504). For example, the cluster 102 and/or the node 108 may compile the integration code into an updated secondary container image. The integration code may be prepared in a programming language such as Java® and may be compiled into an interpretable or executable format and stored within an updated secondary container image that can be loaded into and executed by containers, including sidecar containers.

The secondary container image may be replaced with the updated secondary container image (block 506). For example, the cluster 102 and/or the node 108 may replace the secondary container image 114 containing an old version of the integration function 118 with the updated secondary container image containing the updated version of the integration function 118. In certain instances, the updated secondary container image may be added to a sidecar container 138. For example, the sidecar container 138 may have the secondary container image 114 removed and may instead be loaded with the updated secondary container image in order to implement the updated version of the integration function 118. In additional or alternative implementations, the sidecar container 138 may be terminated and a new sidecar container may be created and loaded with the updated secondary container image. In still further implementations, the updated secondary container image may be stored within the container image storage 106 and may be loaded into a secondary container image with a request that identifies the updated secondary container image (e.g., identifies the updated version of the integration function 118) is received.

By performing the method 500, the cluster 102 and the nodes 108, 110 may be able to update integration functions without interrupting the operation of applications 116 within the nodes. For example, integration functions implemented with external library calls include code incorporated into deployed versions of the applications. Therefore, when the integration functions and external libraries require updates, the entire application may typically need to be rebuilt, which may interrupt performance of the application while the application is terminated and redeployed. By contrast, the method 500 and the sidecar integration function architecture discussed herein enables updated versions of integration functions to be rebuilt and deployed separately from the applications themselves because the applications and the integration functions are implemented using different containers. Therefore, while an updated version of an integration function is deployed in a new or existing sidecar container, the application can continue executing within the primary container with no or minimal service interruptions.

Figure 6:
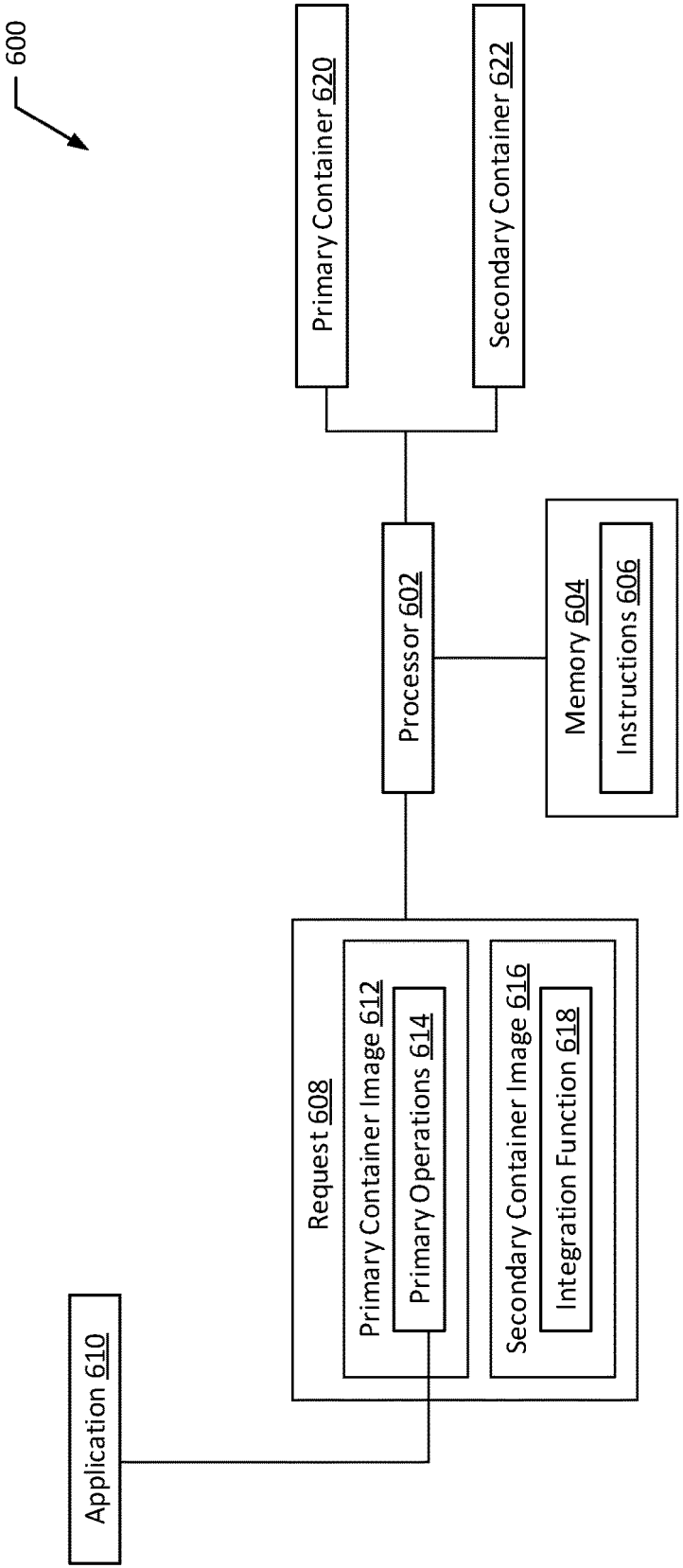
FIG. 6 illustrates a system according to an exemplary embodiment of the present disclosure.

FIG. 6 illustrates a system 600 according to an exemplary embodiment of the present disclosure. The system 600 may include a processor 602 and a memory 604. The memory 604 may store instructions 606 which, when executed by the processor 602, cause the processor 602 to receive a request 608 to execute an application 610. The request 608 may specify (i) a primary container image 612 including primary operations 614 of the application 610 and (ii) a secondary container image 616 including an integration function 618 necessary for proper execution of the primary operations 614. The instructions 606 may further cause the processor 602 to create a primary container 620 for execution of the primary container image 612 and create a secondary container 622 for execution of the secondary container image 616. The secondary container 622 may be a sidecar container of the primary container image 620. The processor

602 may then execute both the primary container 620 and the secondary container 622 to implement the application 610.

All of the disclosed methods and procedures described in this disclosure can be implemented using one or more computer programs or components. These components may be provided as a series of computer instructions on any conventional computer readable medium or machine-readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving a request to execute an application, the request specifying (i) a primary container image including primary operations of the application and (ii) a secondary container image including an integration function necessary for proper execution of the primary operations;
creating a primary container for execution of the primary container image;
creating a secondary container separate from the primary container for execution of the secondary container image, wherein the secondary container is a sidecar container of multiple container images corresponding to multiple containers, including the primary container image corresponding to the primary container; and
executing both the primary container and the secondary container to implement the application.

2. The method of claim 1, wherein, while utilizing the integration function, the primary container and the secondary container exchange one or more messages.

3. The method of claim 2, wherein the messages are exchanged as hypertext transfer protocol (HTTP) calls.

4. The method of claim 1, wherein the request further specifies configuration parameters and wherein the method further comprises:
retrieving the secondary container image; and
configuring the secondary container image at runtime based on the configuration parameters.

5. The method of claim 1, further comprising:
receiving integration code specifying an updated version of the secondary container image;
compiling the integration code into an updated secondary container image; and
replacing the secondary container image with the updated secondary container image.

6. The method of claim 5, wherein the updated secondary container image is compiled without altering the primary container image.

7. The method of claim 1, further comprising compiling application code specifying the primary operations to create the primary container image.

8. The method of claim 1, wherein the method is implemented by an orchestrator of a cluster, the cluster containing a plurality of nodes configured to execute container images.

9. The method of claim 8, wherein the primary container and the secondary container both execute on a first node of the plurality of computing nodes.

10. The method of claim 1, wherein the integration function implements at least one enterprise integration pattern.

11. The method of claim 1, wherein the application requires a plurality of integration functions associated with a plurality of secondary container images to execute properly, and wherein the method further comprises creating a plurality of secondary containers for executing the plurality of secondary container images.

12. A system comprising:
a processor; and
a memory storing instructions which, when executed by the processor, cause the processor to:
receive a request to execute an application, the request specifying (i) a primary container image including primary operations of the application and (ii) a secondary container image including an integration function necessary for proper execution of the primary operations;
create a primary container for execution of the primary container image;
create a secondary container separate from the primary container for execution of the secondary container image, wherein the secondary container is a sidecar container of multiple container images corresponding to multiple containers, including the primary container image corresponding to the primary container; and
execute both the primary container and the secondary container to implement the application.

13. The system of claim 12, wherein, while utilizing the integration function, the primary container and the secondary container exchange one or more messages.

14. The system of claim 12, wherein the request further specifies configuration parameters and wherein, when executed, the instructions further cause the processor to:
retrieve the secondary container image; and
configure the secondary container image at runtime based on the configuration parameters.

15. The system of claim 12, wherein, when executed, the instructions further cause the processor to:
receive integration code specifying an updated version of the secondary container image;
compile the integration code into an updated secondary container image; and
replace the secondary container image with the updated secondary container image.

16. The system of claim 15, wherein the updated secondary container image is compiled without altering the primary container image.

17. The system of claim 12, wherein the system is implemented by an orchestrator of a cluster, the cluster containing a plurality of nodes configured to execute container images.

18. The system of claim 12, wherein the integration function implements at least one enterprise integration pattern.

19. The system of claim 12, wherein the application requires a plurality of integration functions associated with a plurality of secondary container images to execute properly, and wherein, when executed, the instructions further cause the processor to create a plurality of secondary containers for executing the plurality of secondary container images.

20. A non-transitory, computer-readable medium storing instructions which, when executed by a processor, cause the processor to:
- receive a request to execute an application, the request specifying (i) a primary container image including primary operations of the application and (ii) a secondary container image including an integration function necessary for proper execution of the primary operations;
- create a primary container for execution of the primary container image;
- create a secondary container separate from the primary container for execution of the secondary container image, wherein the secondary container is a sidecar container of multiple container images corresponding to multiple containers, including the primary container image corresponding to the primary container; and
- execute both the primary container and the secondary container to implement the application.

\* \* \* \* \*